United States Patent
Chae et al.

(10) Patent No.: US 11,799,085 B2
(45) Date of Patent: Oct. 24, 2023

(54) METHOD OF MANUFACTURING NEGATIVE ELECTRODE FOR LITHIUM SECONDARY BATTERY AND LITHIUM SECONDARY BATTERY

(71) Applicant: LG CHEM, LTD., Seoul (KR)

(72) Inventors: Oh Byong Chae, Daejeon (KR); Sang Wook Woo, Daejeon (KR); Ye Ri Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 555 days.

(21) Appl. No.: 17/252,080

(22) PCT Filed: Sep. 11, 2019

(86) PCT No.: PCT/KR2019/011860
§ 371 (c)(1),
(2) Date: Dec. 14, 2020

(87) PCT Pub. No.: WO2020/055183
PCT Pub. Date: Mar. 19, 2020

(65) Prior Publication Data
US 2021/0159500 A1 May 27, 2021

(30) Foreign Application Priority Data
Sep. 12, 2018 (KR) .................. 10-2018-0108961

(51) Int. Cl.
*H01M 4/587* (2010.01)
*H01M 4/133* (2010.01)
*H01M 4/134* (2010.01)
*H01M 4/1393* (2010.01)
*H01M 4/1395* (2010.01)
*H01M 10/0525* (2010.01)
*H01M 10/0567* (2010.01)
*H01M 4/02* (2006.01)

(52) U.S. Cl.
CPC .......... *H01M 4/587* (2013.01); *H01M 4/133* (2013.01); *H01M 4/134* (2013.01); *H01M 4/1393* (2013.01); *H01M 4/1395* (2013.01); *H01M 10/0525* (2013.01); *H01M 10/0567* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 9,627,716 B2 | 4/2017 | Yang et al. |
| 2011/0159379 A1 | 6/2011 | Matsumoto et al. |
| 2013/0069601 A1 | 3/2013 | Coowar et al. |
| 2015/0093653 A1 | 4/2015 | Coowar et al. |
| 2015/0236343 A1 | 8/2015 | Xiao et al. |
| 2016/0141596 A1 | 5/2016 | Uhm et al. |
| 2016/0172711 A1 | 6/2016 | Yang et al. |
| 2016/0254572 A1 | 9/2016 | Yu et al. |
| 2019/0326625 A1* | 10/2019 | Cheng ............... H01M 10/0525 |

FOREIGN PATENT DOCUMENTS

| | | |
|---|---|---|
| JP | 5726707 B2 | 6/2015 |
| JP | 2016-539487 A | 12/2016 |
| JP | 2017-63069 A | 3/2017 |
| JP | 2018-56548 A | 4/2018 |
| KR | 10-1999-0086308 A | 12/1999 |
| KR | 10-1219375 B1 | 1/2013 |
| KR | 10-1351671 B1 | 1/2014 |
| KR | 10-2015-0014676 A | 2/2015 |
| KR | 10-2016-0038735 A | 4/2016 |

OTHER PUBLICATIONS

JP2018056548A—machine translation (Year: 2018).*
Extended European Search Report dated Sep. 10, 2021 for corresponding EP Application No. 19859668.6.
International Search Report (PCT/ISA/210) issued in PCT/KR2019/011860, dated Dec. 20, 2019.

* cited by examiner

Primary Examiner — Haroon S. Sheikh
(74) Attorney, Agent, or Firm — Birch, Stewart, Kolasch & Birch, LLP

(57) ABSTRACT

A method of manufacturing a negative electrode for a lithium secondary battery, the method includes forming a negative electrode active material layer on a negative electrode current collector to manufacture a negative electrode assembly, and pre-lithiating the negative electrode assembly. The pre-lithiating of the negative electrode assembly includes a first pre-lithiation step of performing pre-lithiation by impregnating the negative electrode assembly with a first pre-lithiation solution and a second pre-lithiation step of performing pre-lithiation by impregnating the negative electrode assembly with a second pre-lithiation solution after the first pre-lithiation step. The first pre-lithiation solution includes an ionizable first lithium salt, a first organic solvent, and a first additive. The second pre-lithiation solution includes an ionizable second lithium salt, a second organic solvent, and a second additive.

13 Claims, No Drawings

METHOD OF MANUFACTURING NEGATIVE ELECTRODE FOR LITHIUM SECONDARY BATTERY AND LITHIUM SECONDARY BATTERY

CROSS-REFERENCE TO RELATED APPLICATION

This application claims priority to and the benefit of Korean Patent Application No. 10-2018-0108961, filed on Sep. 12, 2018, the disclosure of which is incorporated herein by reference in its entirety.

TECHNICAL FIELD

The present invention relates to a method of manufacturing a negative electrode for a lithium secondary battery and a method of manufacturing a lithium secondary battery, and more particularly, to methods of manufacturing a negative electrode for a lithium secondary battery and a lithium secondary battery, in which a pre-lithiation step is performed by being divided into two steps during the manufacture of a negative electrode, and the amount of an additive used in a pre-lithiation solution is reduced in a first pre-lithiation step and increased in a second pre-lithiation step such that a solid electrolyte interface (SEI) film may be more firmly formed on the surface of the negative electrode and the amount of an additive used for an electrolyte solution for a lithium secondary battery may be reduced.

BACKGROUND ART

As the technical development of and the demand for mobile devices increase, the demand for secondary batteries as energy sources is rapidly increasing, and among these secondary batteries, lithium secondary batteries that have high energy density, a high operating voltage, a long cycle lifespan, and a low self-discharge rate are commercially available and widely used.

Meanwhile, a metal oxide such as $LiCoO_2$, $LiMnO_2$, $LiMn_2O_4$, or $LiCrO_2$ is used as a positive electrode active material constituting a positive electrode of a lithium secondary battery, and a material such as metal lithium, a carbon-based material, for example, graphite or activated carbon, or silicon oxide ($SiO_x$) is used as a negative electrode active material constituting a negative electrode. Among the materials used as the negative electrode active material, metal lithium was mainly used initially, but as the charge and discharge cycles progress, lithium atoms grow on the surface of the metal lithium to damage a separator and damage a battery, and thus, recently, a carbon-based material is generally used. However, in the case of carbon-based materials, since a theoretical capacity is only about 400 mAh/g, there is a disadvantage of small capacity. Thus, various studies have been made to replace the carbon-based material with a silicon (Si)-based material having a high theoretical capacity (4,200 mAh/g) as a negative electrode active material.

The lithium secondary battery is charged and discharged while lithium ions of a positive electrode active material of a positive electrode are intercalated into and deintercalated from a negative electrode active material of a negative electrode.

Theoretically, intercalation and deintercalation reactions of lithium into and from a negative electrode active material are completely reversible, but in practice, more lithium is consumed than the theoretical capacity of the negative electrode active material, and only a part of the lithium is recovered during discharging. Accordingly, after the second cycle, a smaller amount of lithium ions are intercalated during charging while most of the intercalated lithium ions are deintercalated during discharging. As described above, the difference in capacity that occurs in the reactions during the first charging and discharging is called an irreversible capacity loss, and since commercialized lithium secondary batteries are manufactured in a state in which lithium ions are supplied only from a positive electrode and lithium is not present in a negative electrode, it is important to minimize the irreversible capacity loss in initial charging and discharging.

Such an initial irreversible capacity loss is known to be caused mainly by an electrolyte decomposition reaction on the surface of a negative electrode active material, and an SEI film is formed on the surface of the negative electrode active material by an electrochemical reaction through electrolyte decomposition. Such formation of the SEI film has a problem of causing an irreversible capacity loss because a large amount of lithium ions are consumed, but the SEI film formed at the beginning of charging prevents the reaction of lithium ions with the negative electrode or other materials during charging and discharging, and serves as an ion tunnel to pass only lithium ions, thereby further suppressing the electrolyte decomposition reaction and contributing to the improvement of cycle characteristics of a lithium secondary battery.

Accordingly, there is a need for methods for improving initial irreversibility caused by the formation of the SEI film and the like, and one of the methods is to perform pre-lithiation before manufacturing a lithium secondary battery so that side reactions that occur during the first charging are experienced in advance. As described above, in the case in which pre-lithiation is performed, when charging and discharging are performed on an actually manufactured secondary battery, there is an advantage that the initial irreversibility can be reduced because the first cycle proceeds in a state in which irreversibility is reduced.

The conventional pre-lithiation method may include, for example, a method of depositing lithium on a negative electrode and a method of directly contacting the lithium with the negative electrode. For example, a lithiated material layer may be formed on a negative electrode active material layer for pre-lithiation, and the lithiated material is vulnerable to oxidation and may be easily oxidized when exposed to moisture or oxygen.

Accordingly, there is a demand for a method of manufacturing a new negative electrode for a lithium secondary battery capable of achieving more effective pre-lithiation.

PRIOR ART DOCUMENT

Patent Document

KR1219375 B

DISCLOSURE

Technical Problem

The present invention is directed to providing methods of efficiently and economically manufacturing a negative electrode for a lithium secondary battery and a method of manufacturing a lithium secondary battery, in which a solid electrolyte interface (SEI) film may be more firmly formed during pre-lithiation of a negative electrode, and the use amount of an additive, which is expensive, in manufacturing a battery may be reduced.

Technical Solution

One aspect of the present invention provides a method of manufacturing a negative electrode for a lithium secondary battery, the method including forming a negative electrode active material layer on a negative electrode current collector to manufacture a negative electrode assembly, and pre-lithiating the negative electrode assembly, wherein the pre-lithiating of the negative electrode assembly includes a first pre-lithiation step of performing pre-lithiation by impregnating the negative electrode assembly with a first pre-lithiation solution and a second pre-lithiation step of performing pre-lithiation by impregnating the negative electrode assembly with a second pre-lithiation solution after the first pre-lithiation step, the first pre-lithiation solution includes an ionizable first lithium salt, a first organic solvent, and a first additive, the second pre-lithiation solution includes an ionizable second lithium salt, a second organic solvent, and a second additive, and a weight ratio of the first additive in the first pre-lithiation solution is less than a weight ratio of the second additive in the second pre-lithiation solution.

Another aspect of the present invention provides a method of manufacturing a lithium secondary battery, the method including manufacturing an electrode assembly including the negative electrode manufactured by the method of manufacturing a negative electrode for a lithium secondary battery, a positive electrode facing the negative electrode, and a separator interposed between the negative electrode and the positive electrode, and inserting the electrode assembly in a battery case and injecting an electrolyte solution into the electrode assembly in the battery case.

Advantageous Effects

In a method of manufacturing a negative electrode for a lithium secondary battery of the present invention, a negative electrode is impregnated with a pre-lithiation solution and pre-lithiation is performed by being divided into two steps, and the content of an additive in a pre-lithiation solution used in first pre-lithiation is less than the content of an additive in a pre-lithiation solution used in second pre-lithiation. By using the pre-lithiation solution having different additive content in the two step pre-lithiation, a solid electrolyte interface (SEI) film can be firmly formed on the negative electrode at an excellent level.

Further, a method of manufacturing a negative electrode for a lithium secondary battery of the present invention can reduce the amount of an additive used in an electrolyte solution required for manufacturing a lithium secondary battery by applying the above-described two step pre-lithiation so that a negative electrode for a lithium secondary battery and a lithium secondary battery can be efficiently and economically manufactured.

MODES OF THE INVENTION

Hereinafter, the present invention will be described in further detail.

The terms or words used in the present specification and claims should not be construed as being limited to ordinary or dictionary meanings and should be construed as meanings and concepts consistent with the spirit of the present invention based on the principle that an inventor can appropriately define concepts and terms to explain the invention of the inventor in the best way.

Method of Manufacturing Negative Electrode for Lithium Secondary Battery

The present invention provides a method of manufacturing a negative electrode for a lithium secondary battery.

Specifically, the method of manufacturing the negative electrode for a lithium secondary battery of the present invention includes forming a negative electrode active material layer on a negative electrode current collector to manufacture a negative electrode assembly, and pre-lithiating the negative electrode assembly, wherein the pre-lithiating of the negative electrode assembly includes a first pre-lithiation step of performing pre-lithiation by impregnating the negative electrode assembly with a first pre-lithiation solution and a second pre-lithiation step of performing pre-lithiation by impregnating the negative electrode assembly with a second pre-lithiation solution after the first pre-lithiation step. The first pre-lithiation solution includes an ionizable first lithium salt, a first organic solvent, and a first additive. The second pre-lithiation solution includes an ionizable second lithium salt, a second organic solvent, and a second additive. The weight ratio of the first additive in the first pre-lithiation solution is less than the weight ratio of the second additive in the second pre-lithiation solution.

According to the method of manufacturing the negative electrode for a lithium secondary battery of the present invention, two step pre-lithiation is performed during the manufacture of the negative electrode, and the content of an additive in a pre-lithiation solution used in first pre-lithiation is less than the content of an additive in a pre-lithiation solution used in second pre-lithiation. By using the pre-lithiation solution having different additive content in the two step pre-lithiation, a solid electrolyte interface (SEI) film may be firmly formed on the negative electrode at an excellent level.

Manufacture of Negative Electrode Assembly

The method of manufacturing the negative electrode for a lithium secondary battery of the present invention includes forming a negative electrode active material layer on a negative electrode current collector to manufacture a negative electrode assembly.

The negative electrode assembly may be manufactured as a negative electrode, specifically a negative electrode for a lithium secondary battery, by pre-lithiation, which will be described below.

The negative electrode current collector is not particularly limited as long as it has a high conductivity without causing chemical changes in the battery. Specifically, as the negative electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The negative electrode current collector may generally have a thickness of 3 μm to 500 μm.

The negative electrode current collector may have fine irregularities formed on a surface thereof to increase the binding force of a negative electrode active material. For example, the negative electrode current collector may be used in various forms such as a film, a sheet, a foil, a net, a porous body, a foamed body, a non-woven fabric, and the like.

The negative electrode active material layer is formed on the negative electrode current collector.

The negative electrode active material layer may include a negative electrode active material.

The negative electrode active material may include at least one selected from the group consisting of a silicon-based negative electrode active material and a carbon-based negative electrode active material.

The silicon-based negative electrode active material may impart excellent capacity characteristics, durability, and the like. Specifically, the silicon-based negative electrode active material may include a compound represented by $SiO_x$ ($0 \leq x < 2$). Since $SiO_2$ may not react with lithium ions and thus not store lithium, x is preferably within the above range, and more preferably, the silicon-based oxide may be SiO.

An average particle size ($D_{50}$) of the silicon-based negative electrode active material may be in a range of 1 μm to 30 μm, preferably 3 μm to 15 μm, in terms of reducing side reactions with an electrolyte solution while providing structural stability during charging and discharging.

The carbon-based negative electrode active material may impart excellent cycle characteristics or battery lifespan performance, and specifically, the carbon-based negative electrode active material may include at least one selected from the group consisting of graphite, artificial graphite, natural graphite, hard carbon, soft carbon, carbon black, acetylene black, Ketjen black, Super P, graphene, and fibrous carbon, and preferably, at least one selected from the group consisting of graphite, artificial graphite, and natural graphite.

The average particle size ($D_{50}$) of the carbon-based negative electrode active material may be in a range of 10 μm to 30 μm, preferably 15 μm to 25 μm, in terms of reducing side reactions with an electrolyte solution and providing structural stability during charging and discharging.

Specifically, the negative electrode active material preferably uses both the silicon-based negative electrode active material and the carbon-based negative electrode active material in terms of simultaneously improving capacity characteristics and cycle characteristics, and specifically, the negative electrode active material may include the silicon-based negative electrode active material and the carbon-based negative electrode active material at a weight ratio of 1:99 to 50:50, preferably 20:80 to 40:60, and the above-described range is preferable in terms of simultaneously improving the capacity characteristics and the cycle characteristics.

The negative electrode active material may be included in the negative electrode active material layer in an amount of 60 wt % to 99 wt %, preferably 75 wt % to 95 wt % based on the total weight of the negative electrode active material layer.

The negative electrode active material layer may further include a binder and/or a conducting agent in addition to the negative electrode active material.

The binder is used to improve the performance of a battery by improving the adhesion between the negative electrode active material layer and the negative electrode current collector, and may be, for example, at least one selected from the group consisting of a polyvinylidene fluoride-hexafluoropropylene copolymer (PVDF-co-HFP), polyvinylidene fluoride (PVDF), polyacrylonitrile, polymethylmethacrylate, polyvinyl alcohol, carboxymethylcellulose (CMC), starch, hydroxypropylcellulose, regenerated cellulose, polyvinylpyrrolidone, tetrafluoroethylene, polyethylene, a propylene polymer, polyacrylic acid, an ethylene-propylene-diene monomer (EPDM), a sulfonated EPDM, styrene butadiene rubber (SBR), fluorine rubber, and the above-mentioned materials whose hydrogen is substituted with Li, Na or Ca, or various copolymers thereof.

The binder may be included in the negative electrode active material layer in an amount of 0.5 wt % to 10 wt %, preferably 1 wt % to 5 wt % based on the total weight of the negative electrode active material layer.

The conducting agent is not particularly limited as long as it has conductivity without causing chemical changes in the battery, and for example, graphite such as natural graphite or artificial graphite; carbon black such as acetylene black, Ketjen black, channel black, furnace black, lamp black or thermal black; a conductive fiber such as a carbon fiber or a metal fiber; a conductive tube such as a carbon nanotube; metal powder such as fluorocarbon powder, aluminum powder or nickel powder; a conductive whisker such as zinc oxide or potassium titanate; a conductive metal oxide such as titanium oxide; or a conductive material such as a polyphenylene derivative may be used.

The conducting agent may be included in the negative electrode active material layer in an amount of 0.5 wt % to 10 wt %, preferably 1 wt % to 5 wt % based on the total weight of the negative electrode active material layer.

A thickness of the negative electrode active material layer may be in a range of 10 μm to 100 μm, preferably 50 μm to 80 μm.

The negative electrode assembly may be prepared by dispersing a negative electrode active material, a binder, and a conducting agent in a solvent for forming a negative electrode slurry on a negative electrode current collector to prepare a negative electrode active material slurry, coating the negative electrode current collector with the negative electrode active material slurry, and followed by drying and rolling.

The solvent for forming the negative electrode active material slurry may include at least one selected from the group consisting of distilled water, ethanol, methanol, and isopropyl alcohol, preferably distilled water, in terms of facilitating the dispersion of the components.

Pre-Lithiation of Negative Electrode Assembly

The method of manufacturing the negative electrode for a lithium secondary battery of the present invention includes pre-lithiating the negative electrode assembly.

The pre-lithiating of the negative electrode assembly includes a first pre-lithiation step of performing pre-lithiation by impregnating the negative electrode assembly with a first pre-lithiation solution and a second pre-lithiation step of performing pre-lithiation by impregnating the negative electrode assembly with a second pre-lithiation solution after the first pre-lithiation step. The first pre-lithiation solution includes an ionizable first lithium salt, a first organic solvent, and a first additive. The second pre-lithiation solution includes an ionizable second lithium salt, a second organic solvent, and a second additive. The weight ratio of the first additive in the first pre-lithiation solution is less than the weight ratio of the second additive in the second pre-lithiation solution.

According to the method of manufacturing the negative electrode for a lithium secondary battery of the present invention, the pre-lithiation performed on the negative electrode assembly is performed by being divided into a first pre-lithiation step using a first pre-lithiation solution including a first additive, and a second pre-lithiation step using a second pre-lithiation solution including a second additive, and the weight ratio of the first additive in the first pre-lithiation solution is less than the weight ratio of the second additive in the second pre-lithiation solution. In the negative electrode manufactured by performing the first pre-lithiation step and the second pre-lithiation step, an SEI film may be firmly formed while preventing the damage and volume expansion of an active material due to rapid pre-lithiation, and thus it is desirable in terms of improving the lifespan characteristics of the negative electrode.

The pre-lithiating of the negative electrode assembly includes a first pre-lithiation step of performing pre-lithiation by impregnating the negative electrode assembly with a first pre-lithiation solution, and a step of performing pre-lithiation by impregnating the negative electrode assembly with a second pre-lithiation solution after the first pre-lithiation step.

The first pre-lithiation solution includes an ionizable first lithium salt, a first organic solvent, and a first additive, the second pre-lithiation solution includes an ionizable second lithium salt, a second organic solvent, and a second additive, and the weight ratio of the first additive in the first pre-lithiation solution is less than the weight ratio of the second additive in the second pre-lithiation solution.

According to the method of manufacturing the negative electrode for a lithium secondary battery of the present invention, two step pre-lithiation is performed during the manufacture of the negative electrode, and the content of an additive in a pre-lithiation solution used in first pre-lithiation is less than the content of an additive in a pre-lithiation solution used in second pre-lithiation.

An additive used in the pre-lithiation solution is used as a material capable of forming a chemical bond such that, for example, an SEI film is formed on the surface of a negative electrode during pre-lithiation by electrochemical charging. However, when the additive is excessively used in the early stage of pre-lithiation, the additive is decomposed excessively, causing the SEI film to form at a high rate, and thus it is difficult to form the SEI film uniformly and firmly. In addition, the SEI film may be uniformly formed when the additive is added in a small amount in the early stage of pre-lithiation, but the amount of the additive is not sufficient to achieve the purpose of pre-lithiation.

Thus, according to the present invention, in the first pre-lithiation step, the content of the additive in the pre-lithiation solution is used in a relatively small amount such that an SEI film is formed thin and uniform on the surface of the negative electrode, and in the second pre-lithiation step, the content of the additive in the pre-lithiation solution is used in a relatively large amount such that an SEI film is formed more firmly and sufficiently on the film formed uniformly in the first pre-lithiation step. By using the pre-lithiation solution having different additive content in the two step pre-lithiation, the SEI film may be uniformly and firmly formed on the negative electrode, and the cycle lifespan characteristics of the negative electrode may be improved to a significant level.

The first pre-lithiation step may be performed by impregnating the negative electrode assembly with a first pre-lithiation solution to perform pre-lithiation, and specifically, impregnating the negative electrode assembly with the first pre-lithiation solution and performing first electrochemical charging using lithium metal as a counter electrode.

The first pre-lithiation solution includes an ionizable first lithium salt, a first organic solvent, and a first additive, and the second pre-lithiation solution includes an ionizable second lithium salt, a second organic solvent, and a second additive.

The first lithium salt and the second lithium salt are ionizable, and may each independently include at least one selected from the group consisting of $LiPF_6$, $LiClO_4$, $LiAsF_6$, $LiBF_4$, $LiSbF_6$, $LiAlO_4$, $LiAlO_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, and $LiB(C_2O_4)_2$, and may preferably include $LiPF_6$.

The first organic solvent and the second organic solvent may serve to carry out an electrochemical reaction and perform a role of a medium enabling the movement of ions, and specifically, may include ester-based solvents such as methyl acetate, ethyl acetate, γ-butyrolactone, and ε-caprolactone; ether-based solvents such as dibutyl ether and tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), methyl ethyl carbonate (MEC), ethyl methyl carbonate (EMC), ethylene carbonate (EC), and propylene carbonate (PC); alcohol-based solvents such as ethyl alcohol and isopropyl alcohol; nitriles such as R—CN (R is a straight, branched, or cyclic C2 to C20 hydrocarbon group and may include a double-bonded aromatic ring or an ether bond); amides such as dimethylformamide; dioxolanes such as 1,3-dioxolane; sulfolanes; and the like. Preferably, the first organic solvent and the second organic solvent may be carbonate-based solvents in terms of improving electrochemical stability, more preferably at least one selected from the group consisting of ethyl methyl carbonate (EMC) and ethylene carbonate (EC), and more specifically ethyl methyl carbonate (EMC) and ethylene carbonate (EC).

The first additive and the second additive are, for example, materials capable of forming an SEI film on the surface of a negative electrode by being decomposed during electrochemical charging, and may each independently include at least one selected from the group consisting of fluoroethylene carbonate (FEC), vinylene carbonate (VC), vinyl ethylene carbonate (VEC), ethylene sulfate (ES), allyl ethyl carbonates, vinyl acetate, divinyl adipate, 2-vinyl pyridine, acid anhydrides, methyl cinnamate, salicylic acid, aromatic esters, succinimides, N-benzyloxyl carbonyloxy succinimide, lithium bis(oxalato)borate (LiBOB), and lithium difluoro(oxalato)borate (LiOdFB), and more preferably may include fluoroethylene carbonate.

The first additive may be included in the first pre-lithiation solution in an amount of 0.1 wt % to 2.5 wt %, and specifically 0.5 wt % to 2 wt %. The above-described range is preferable because the SEI film exhibited from the additive in the first pre-lithiation step may be formed on the surface of a negative electrode at a uniform level.

The second additive may be included in the second pre-lithiation solution in an amount of 3 wt % to 15 wt %, and specifically 5 wt % to 10 wt %. Within the above-described range, the film exhibited from the second additive may be firmly formed on the SEI film formed uniformly in the first pre-lithiation, and a phenomenon in which the thickness of the film is excessively increased due to the excessive use of additives and thus resistance is increased is prevented.

The pre-lithiating of the negative electrode assembly may be performed by impregnating the negative electrode assembly with the first pre-lithiation solution and performing first electrochemical charging using lithium metal as a counter electrode, and the second pre-lithiation step may be performed by impregnating the negative electrode assembly, which is charged through the first electrochemical charging, with the second pre-lithiation solution and performing second electrochemical charging using lithium metal as a counter electrode.

he first electrochemical charging and the second electrochemical charging may be performed independently of each other at a current intensity of 0.1 mA/cm$^2$ to 10 mA/cm$^2$, preferably 0.2 mA/cm$^2$ to 8 mA/cm$^2$. The above range is preferable in terms of preventing the sudden deformation of a negative electrode or a Li-Plating phenomenon due to excessively high current intensity during electrochemical charging, and preventing inadequate pre-lithiation and side reactions due to excessively low current intensity during electrochemical charging.

The first electrochemical charging may be performed up to 5% to 15%, preferably 7% to 13% of the charge capacity of the negative electrode assembly. Performing the first electrochemical charging within above-described range is preferable in terms of uniformly forming a more stable and robust SEI film on the surface of the negative electrode.

The second electrochemical charging may be performed up to 15% to 35% of the charge capacity of the negative electrode assembly, preferably up to 17% to 33%. When the second electrochemical charging is performed in the above-described range, a robust polymer film may be formed on the film formed in the first pre-lithiation step, and a problem of increasing resistance due to a thick polymer film caused by excessive charging may be prevented.

In the first pre-lithiation step, the pre-lithiation is performed in the range of 20% to 40% of the expected amount of pre-lithiation, in the second pre-lithiation step, the pre-lithiation may be performed in the range of 60% to 80% of the expected amount of pre-lithiation, and a stable and robust film may be formed when the pre-lithiation is performed within the above-described ranges. When the amount of pre-lithiation in the first pre-lithiation is in a range lower than the range of 20% to 40% and the amount of pre-lithiation in the second pre-lithiation is in a range higher than the range of 60% to 80%, it may be difficult to form a stable film, and when the amount of pre-lithiation in the first pre-lithiation is in a range higher than the range of 20% to 40% and the amount of pre-lithiation in the second pre-lithiation is in a range lower than the range of 60% to 80%, the surface film may be too thin and may not be firm.

The pre-lithiation steps may be performed at 10° C. to 200° C. for 2 to 48 hours. Specifically, the first pre-lithiation step and the second pre-lithiation step may be performed at 10° C. to 200° C. for 2 to 48 hours. When the pre-lithiation is performed in the above-described ranges, lithium metal may be smoothly intercalated into a negative electrode while the pre-lithiation is sufficiently performed.

Method of Manufacturing Lithium Secondary Battery

Further, the present invention provides a method of manufacturing a lithium secondary battery.

Specifically, the method of manufacturing the lithium secondary battery of the present invention includes manufacturing an electrode assembly including the negative electrode manufactured by the above-described manufacturing method of a negative electrode for a lithium secondary battery, a positive electrode facing the negative electrode, and a separator interposed between the negative electrode and the positive electrode, and accommodating the electrode assembly in a battery case and injecting an electrolyte solution thereinto.

The electrolyte solution may include an ionizable third lithium salt, a third organic solvent, and a third additive.

The third lithium salt is ionizable and may include at least one selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, and $LiB(C_2O_4)_2$, and may preferably include $LiPF_6$.

The third organic solvent may serve to carry out an electrochemical reaction and perform a role of a medium enabling the movement of ions, and specifically, may include ester-based solvents such as methyl acetate, ethyl acetate, γ-butyrolactone, and ε-caprolactone; ether-based solvents such as dibutyl ether and tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), methyl ethyl carbonate (MEC), ethyl methyl carbonate (EMC), ethylene carbonate (EC), and propylene carbonate (PC); alcohol-based solvents such as ethyl alcohol and isopropyl alcohol; nitriles such as R—CN (R is a straight, branched, or cyclic C2 to C20 hydrocarbon group and may include a double-bonded aromatic ring or an ether bond); amides such as dimethylformamide; dioxolanes such as 1,3-dioxolane; sulfolanes; and the like. Preferably, the third organic solvent may be carbonate-based solvents in terms of improving electrochemical stability, more preferably at least one selected from the group consisting of ethyl methyl carbonate (EMC) and ethylene carbonate (EC), and more specifically ethyl methyl carbonate (EMC) and ethylene carbonate (EC).

The third additive may be added to additionally form a surface film during long-term cycle charging and discharging, and specifically, may include at least one selected from the group consisting of fluoroethylene carbonate (FEC), vinylene carbonate (VC), vinyl ethylene carbonate (VEC), ethylene sulfate (ES), allyl ethyl carbonates, vinyl acetate, divinyl adipate, 2-vinyl pyridine, acid anhydrides, methyl cinnamate, salicylic acid, aromatic esters, succinimides, N-benzyloxyl carbonyloxy succinimide, lithium bis(oxalato)borate (LiBOB), and lithium difluoro(oxalato)borate (LiOdFB), and preferably may include fluoroethylene carbonate.

The weight ratio of the third additive in the electrolyte solution may be less than the weight ratio of the second additive in the second pre-lithiation solution. In general, additives are expensive, but since the pre-lithiation solutions (first and second pre-lithiation solutions) used in the pre-lithiation step may be reused several times, it is possible to realize a lithium secondary battery having high cycle lifespan characteristics even when the amount of the third additive used in manufacturing a lithium secondary battery is relatively small, and an effect not less than that of a secondary battery which uses an electrolyte solution including a large amount of additives may be obtained.

The third additive may be included in an amount of 0.1 wt % to 7 wt %, preferably 0.2 wt % to 6 wt % in the electrolyte solution, and within the above-described range, it is possible to prevent the cycle lifespan from being deteriorated due to the over-voltage caused by the excessive addition while the additional surface film in the long-term cycle is smoothly formed.

The positive electrode includes a positive electrode current collector and a positive electrode active material layer formed on the positive electrode current collector.

The positive electrode may be manufactured according to a conventional method of manufacturing a positive electrode generally known in the art. For example, the positive electrode may be manufactured by dissolving or dispersing components constituting the positive electrode active material layer, that is, the positive electrode active material, a conducting agent and/or a binder, and the like in a solvent to prepare a positive electrode mixture, applying the positive electrode mixture on at least one surface of the positive electrode current collector, and then drying and pressing the resulting product, or casting the positive electrode mixture on a separate support and then laminating a film peeled from the support on the positive electrode current collector.

The positive electrode current collector is not particularly limited as long as it has conductivity without causing chemical changes in a battery, and for example, stainless steel, aluminum, nickel, titanium, calcined carbon, or aluminum or stainless steel whose surface is treated with carbon, nickel, titanium or silver may be used. In addition, the positive electrode current collector may generally have a thickness of 3 µm to 500 µm, and fine irregularities may be formed on the surface of the current collector to increase the adhesion of the positive electrode active material. For example, the positive electrode current collector may be used in various forms such as a film, a sheet, a foil, a net, a porous body, a foamed body, a nonwoven fabric, and the like.

Examples of the positive electrode active material may include layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ (where y is 0 to 0.33), $LiMnO_3$, $LiMn_2O_3$, $LiMnO_2$, and the like; lithium copper oxide ($Li_2CuO_2$); vanadium oxides such as $LiV_3O_8$, $V_2O_5$, $Cu_2V_2O_7$, and the like; Ni-site type lithium nickel oxides of Formula $LiNi_{1-y}M_yO_2$ (where M=Co, Mn, Al, Cu, Fe, Mg, B, or Ga, and y=0.01 to 0.3); lithium manganese composite oxides of Formula $LiMn_{2-y}M_yO_2$ (where M=Co, Ni, Fe, Cr, Zn, or Ta, and y=0.01 to 0.1), or Formula $Li_2Mn_3MO_8$ (where M=Fe, Co, Ni, Cu, or Zn); $LiMn_2O_4$ wherein a portion of Li of Formula is substituted with alkaline earth metal ions; disulfide compounds; $Fe_2(MoO_4)_3$, and the like, but the present invention is not limited thereto.

Further, the binder and the conducting agent may be the same as described above for the negative electrode.

The separator is not particularly limited as long as it is generally used in a secondary battery to separate a negative electrode from a positive electrode and provide a moving path for lithium ions, and particularly, it is preferable that the separator has low resistance to ion movement of an electrolyte and an excellent ability to be impregnated with an electrolyte solution. Specifically, a porous polymer film, for example, a porous polymer film formed of a polyolefin-based polymer such as an ethylene homopolymer, a propylene homopolymer, an ethylene/butene copolymer, an ethylene/hexene copolymer and an ethylene/methacrylate copolymer, or a stacked structure having two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to secure thermal resistance or mechanical strength, and may be selectively used in a single- or multi-layered structure.

The lithium secondary battery may be manufactured according to a conventional method of manufacturing a lithium secondary battery, except for the above-described contents.

The lithium secondary battery manufactured above is useful in portable devices such as a mobile phone, a notebook computer, and a digital camera and an electric vehicle field such as a hybrid electric vehicle (HEV).

Further, the lithium secondary battery may be applied to a battery module including the secondary battery as a unit cell or a battery pack including the same.

The battery module or the battery pack may be used as a power supply of a medium- to large-sized device of any one or more of power tools; electric vehicles including electric vehicles (EV), hybrid electric vehicles and plug-in hybrid electric vehicle (PHEV); or systems for power storage.

Hereinafter, examples of the present invention will be described in detail so that those of ordinary skill in the art can easily carry out the present invention. However, the present invention may be embodied in various different forms and is not limited to the examples described below.

EXAMPLES

Example 1

Manufacture of Negative Electrode Assembly

A negative electrode active material slurry was prepared by adding 92 wt % of a negative electrode active material (graphite: SiO=7:3), 3 wt % of a conducting agent (Denka black), 3.5 wt % of a binder (SBR), and 1.5 wt % of a thickener (CMC) to water.

One surface of a copper current collector was coated with the negative electrode active material slurry prepared above, and dried and rolled to manufacture a negative electrode assembly.

Pre-Lithiation of Negative Electrode Assembly

A first pre-lithiation solution was prepared by adding 1 wt % of fluoroethylene carbonate (FEC) as a first additive to a solvent (first organic solvent) in which ethylene carbonate (EC) and ethyl methyl carbonate (EMC) were mixed in a volume ratio of 3:7 and dissolving $LiPF_6$ as a first lithium salt in the solvent to have a concentration of 1 M.

A second pre-lithiation solution was prepared by adding 10 wt % of fluoroethylene carbonate (FEC) as a second additive to a solvent (second organic solvent) in which ethylene carbonate (EC) and ethyl methyl carbonate (EMC) were mixed in a volume ratio of 3:7 and dissolving $LiPF_6$ as a second lithium salt in the solvent to have a concentration of 1 M.

The negative electrode assembly manufactured above was cut into a size of 10 cm×10 cm, wetted with the first pre-lithiation solution for 3 hours, and then subjected to electrochemical charging using lithium metal as a counter electrode in a state in which the first pre-lithiation solution was present, thereby performing first pre-lithiation on the negative electrode. Here, the current intensity was set to 2 mA/cm$^2$, and charging was performed up to 10% of the charge capacity of the negative electrode.

The negative electrode assembly, which completed the first pre-lithiation in the first pre-lithiation solution, was taken out from the first pre-lithiation solution and put in the second pre-lithiation solution to wet for 3 hours, and then electrochemical charging was performed by using lithium metal as a counter electrode in a state in which the second pre-lithiation solution was present, thereby performing second pre-lithiation on the negative electrode. Here, the current intensity was set to 2 mA/cm$^2$, and charging was performed up to 15% of the charge capacity of the negative electrode assembly.

As described above, charging was performed up to 25% of the charge capacity of the negative electrode assembly through the two step pre-lithiation.

Subsequently, the negative electrode assembly having completed all of the pre-lithiation was washed with EMC, dried at room temperature, and was used as a negative electrode of Example 1.

Manufacture of Lithium Secondary Battery

An aluminum current collector was coated with a positive electrode slurry in which LiCoO$_2$ as a positive electrode active material, Super C as a conducting agent, and PVdF as a binder were mixed at a weight ratio 97:1.5:1.5, and rolled and dried at 130° C. to manufacture a positive electrode.

A propylene polymer separator was interposed between the pre-lithiated negative electrode manufactured above and the positive electrode, and an electrolyte solution obtained by adding 1 wt % of FEC to a solvent in which EC and EMC were mixed at a volume ratio of 3:7 and dissolving LiPF$_6$ at a concentration of 1 M was injected to manufacture a coin-type full cell.

Example 2

A negative electrode and a coin-type full cell were manufactured by performing the same procedure as in Example 1, except that the content of FEC as an additive used for an electrolyte solution was 5 wt % in a second pre-lithiation solution in a pre-lithiation step.

Comparative Example 1

A negative electrode and a coin-type full cell were manufactured by performing the same procedure as in Example 1, except that pre-lithiation was performed using the second pre-lithiation solution without using a first pre-lithiation solution in a first pre-lithiation step.

Comparative Example 2

A negative electrode and a coin-type full cell were manufactured by performing the same procedure as in Example 2, except that pre-lithiation was performed using the second pre-lithiation solution without using a first pre-lithiation solution in a first pre-lithiation step.

Comparative Example 3

A negative electrode and a coin-type full cell were manufactured by performing the same procedure as in Example 1, except that pre-lithiation was performed using the first pre-lithiation solution without using a second pre-lithiation solution in a second pre-lithiation step.

Comparative Example 4

A pre-lithiation solution was prepared by dissolving LiPF$_6$ as a lithium salt in a solvent in which ethylene carbonate (EC) and ethyl methyl carbonate (EMC) were mixed in a volume ratio of 3:7 to have a concentration of 1 M. No additives were added to the pre-lithiation solution.

The negative electrode assembly manufactured in Example 1 was cut into a size of 10 cm×10 cm, wetted with the pre-lithiation solution for 3 hours, and then subjected to electrochemical charging using lithium metal as a counter electrode in a state in which the pre-lithiation solution was present, thereby performing pre-lithiation on the negative electrode. Here, the current intensity was set to 2 mA/cm$^2$, and charging was performed up to 25% of the charge capacity of the negative electrode.

Subsequently, the negative electrode assembly was washed with EMC, dried at room temperature, and used as a negative electrode of Comparative Example 4.

A coin-type full cell was manufactured in the same manner as in Example 1, except that the negative electrode manufactured above in Comparative Example 4 was used.

Comparative Example 5

A negative electrode and a coin-type full cell were manufactured by performing the same procedure as in Example 1, except that a pre-lithiation process was not performed.

Experimental Example 1

Cycle Charge and Discharge Experiments

The coin-type full cells manufactured in Examples 1 and 2 and Comparative

Examples 1 to 5 were subjected to a reversibility test using an electrochemical charging and discharging device. Charging was performed by applying a current at a current density of 0.1 C-rate up to a voltage of 4.2V, and discharging was performed at the same current density until a voltage of 2.5V. After charging and discharging are performed up to 100 cycles under the above conditions, a 100-cycle capacity retention rate of each of the coin-type full cells of the Examples and Comparative Examples was measured and calculated according to Equation 1.

Capacity retention rate (%)=(discharge capacity at 100th cycle/discharge capacity at first cycle)×100 [Equation 1]

Experimental Example 2

Initial Efficiency Evaluation

The negative electrode manufactured in each of Examples 1 and 2 and Comparative Examples 1 to 5 was punched into a coin cell size, lithium metal as a counter electrode was placed to face the negative electrode, a propylene polymer separator was interposed between the negative electrode and the lithium metal, and an electrolyte solution was injected to manufacture a coin-type half cell of each of the Examples and Comparative Examples. As the electrolyte solution, a solution obtained by adding 1 wt % of FEC to a solvent in which EC and EMC were mixed at a volume ratio of 3:7 and dissolving LiPF$_6$ at a concentration of 1 M was used.

The above-manufactured coin-type half cell of each of the Examples and Comparative Examples was charged by applying a current at a current density of 0.1 C-rate up to a voltage of 0.005V (vs. Li/Li$^+$) using an electrochemical charging and discharging device, and discharged until a voltage of 1.5 V at the same current density. At this time, the charge capacity and the initial discharge capacity of the coin-type half cell of each of the Examples and Comparative Examples in the first cycle were measured, and initial efficiency (%) was calculated according to Equation 2 below. The results are shown in Table 1 below.

Initial efficiency (%)=(discharge capacity at first cycle/charge capacity at first cycle)×100 [Equation 2]

TABLE 1

| | First pre-lithiation solution | Second pre-lithiation solution | Cell electrolyte solution | Initial efficiency (%) | 100-cycle capacity retention rate (%) |
|---|---|---|---|---|---|
| Example 1 | 1M $LiPF_6$, EC:EMC = 3:7, FEC = 1 wt % | 1M $LiPF_6$, EC:EMC = 3:7, FEC = 10 wt % | 1M $LiPF_6$, EC:EMC = 3:7, FEC = 1 wt % | 105 | 92 |
| Example 2 | 1M $LiPF_6$, EC:EMC = 3:7, FEC = 1 wt % | 1M $LiPF_6$, EC:EMC = 3:7, FEC = 5 wt % | 1M $LiPF_6$, EC:EMC = 3:7, FEC = 1 wt % | 104 | 89 |
| Comparative Example 1 | 1M $LiPF_6$, EC:EMC = 3:7, FEC = 10 wt % | | 1M $LiPF_6$, EC:EMC = 3:7, FEC = 1 wt % | 99 | 82 |
| Comparative Example 2 | 1M $LiPF_6$, EC:EMC = 3:7, FEC = 5 wt % | | 1M $LiPF_6$, EC:EMC = 3:7, FEC = 1 wt % | 99 | 83 |
| Comparative Example 3 | 1M $LiPF_6$, EC:EMC = 3:7, FEC = 1 wt % | | 1M $LiPF_6$, EC:EMC = 3:7, FEC = 1 wt % | 98 | 77 |
| Comparative Example 4 | 1M $LiPF_6$, EC:EMC = 3:7, FEC = 0 wt % | | 1M $LiPF_6$, EC:EMC = 3:7, FEC = 1 wt % | 97 | 72 |
| Comparative Example 5 | Pre-lithiation not performed | | 1M $LiPF_6$, EC:EMC = 3:7, FEC = 1 wt % | 79 | 51 |

In the case of Examples 1 and 2, the polymer film exhibited by FEC on the surface of the negative electrode active material may be more firmly formed by pre-lithiating a portion of the negative electrode active material in a pre-lithiation solution with a low concentration of an FEC additive of 1 wt % to form a stabilized thin polymer film exhibited by FEC on the surface of the negative electrode active material and then pre-lithiating the remaining portion of the negative electrode active material in a pre-lithiation solution with a high concentration of an FEC additive of 10 wt % or 5 wt %.

Therefore, the negative electrode manufactured by the manufacturing method according to the Examples may exhibit high initial efficiency because lithium ions may stably enter the negative electrode during pre-lithiation due to the stabilized and firm polymer film, and also, the 100-cycle capacity retention rate was also high because the deterioration of the negative electrode active material may be suppressed even after performing long-term cycle charging and discharging due to the effect of such a film.

On the other hand, it was determined that in the case in which the pre-lithiation is performed directly in the pre-lithiation solution with the high concentration of an FEC additive without performing the first pre-lithiation in the pre-lithiation solution with the low concentration of an FEC additive as in Comparative Examples 1 and 2, a non-uniform and unstable polymer film may be formed on the surface of the negative electrode active material as compared with the case in which the first pre-lithiation was performed. Therefore, the initial efficiency and the 100-cycle capacity retention rate of cells manufactured using such a negative electrode were poor compared to those of Examples 1 and 2.

Meanwhile, in the case of Comparative Example 3 in which the pre-lithiation was performed only in the pre-lithiation solution with the low concentration of an FEC additive, it was determined that the polymer film exhibited by FEC was formed too thin on the surface of the negative electrode active material and thus the electrochemical performance was not excellent. In addition, in the case of Comparative Example 4 in which the pre-lithiation was performed in the pre-lithiation solution not including the FEC additive, it was determined that the electrochemical performance was poor because there was almost no surface polymer film exhibited by FEC, and in the case of Comparative Example 5 in which the pre-lithiation was not performed, it was found that the initial efficiency and the 100-cycle capacity retention rate were remarkably reduced because there was no effect of pre-lithiation itself

The invention claimed is:

1. A method of manufacturing a negative electrode for a lithium secondary battery, the method comprising:
   forming a negative electrode active material layer on at least one surface of a negative electrode current collector to manufacture a negative electrode assembly; and
   pre-lithiating the negative electrode assembly, wherein the pre-lithiating of the negative electrode assembly comprises
     a first pre-lithiation step of performing pre-lithiation by impregnating the negative electrode assembly with a first pre-lithiation solution; and
     a second pre-lithiation step of performing pre-lithiation by impregnating the negative electrode assembly with a second pre-lithiation solution after the first pre- lithiation step,
   wherein the first pre-lithiation solution comprises an ionizable first lithium salt, a first organic solvent, and a first additive,
   wherein the second pre-lithiation solution comprises an ionizable second lithium salt, a second organic solvent, and a second additive, and
   wherein a weight ratio of the first additive in the first pre-lithiation solution is less than a weight ratio of the second additive in the second pre-lithiation solution.

2. The method of claim 1, wherein the first additive and the second additive each independently comprise at least one selected from the group consisting of fluoroethylene carbonate, vinylene carbonate, vinyl ethylene carbonate, ethylene sulfate, allyl ethyl carbonates, vinyl acetate, divinyl adipate, 2-vinyl pyridine, acid anhydrides, methyl cinnamate, salicylic acid, aromatic esters, succinimides, N-benzyloxyl carbonyloxy succinimide, lithium bis(oxalato)borate, and lithium difluoro(oxalato)borate.

3. The method of claim 1, wherein the first additive is present in the first pre-lithiation solution in an amount of 0.1 wt % to 2.5 wt %.

4. The method of claim 1, wherein the second additive is present in the second pre-lithiation solution in an amount of 3 wt % to 15 wt %.

5. The method of claim 1, wherein the pre-lithiating of the negative electrode assembly is performed at a temperature of 10° C. to 200° C. for 2 hours to 48 hours.

6. The method of claim 1, wherein
the negative electrode active material layer comprises a negative electrode active material, and
wherein the negative electrode active material comprises a silicon-based negative electrode active material and a carbon-based negative electrode active material at a weight ratio of 1:99 to 50:50.

7. The method of claim 1, wherein
the first pre-lithiation step is performed by impregnating the negative electrode assembly with the first pre-lithiation solution and performing a first electrochemical charging using lithium metal as a counter electrode, and
wherein the second pre-lithiation step is performed by impregnating the negative electrode assembly after performing the first electrochemical charging with the second pre-lithiation solution and performing a second electrochemical charging using lithium metal as a counter electrode.

8. The method of claim 7, wherein the first electrochemical charging and the second electrochemical charging are independently performed with a current intensity of 0.1 mA/cm$^2$ to 10 mA/cm$^2$.

9. The method of claim 7, wherein
the first electrochemical charging is performed up to 5% to 15% of a charge capacity of the negative electrode assembly, and
wherein the second electrochemical charging is performed up to 15% to 35% of a charge capacity of the negative electrode assembly.

10. A method of manufacturing a lithium secondary battery, the method comprising:
manufacturing an electrode assembly comprising:
the negative electrode manufactured by the method of manufacturing a negative electrode for a lithium secondary battery of claim 1;
a positive electrode facing the negative electrode; and
a separator interposed between the negative electrode and the positive electrode; and
inserting the electrode assembly in a battery case, and injecting an electrolyte solution into the electrode assembly in the battery case.

11. The method of claim 10, wherein
the electrolyte solution comprises an ionizable third lithium salt, a third organic solvent, and a third additive, and
wherein a weight ratio of the third additive in the electrolyte solution is less than a weight ratio of the second additive in the second pre-lithiation solution.

12. The method of claim 11, wherein the third additive is present in the electrolyte solution in an amount of 0.1 wt % to 7 wt %.

13. The method of claim 11, wherein the third additive comprises at least one selected from the group consisting of fluoroethylene carbonate, vinylene carbonate, vinyl ethylene carbonate, ethylene sulfate, allyl ethyl carbonates, vinyl acetate, divinyl adipate, 2-vinyl pyridine, acid anhydrides, methyl cinnamate, salicylic acid, aromatic esters, succinimides, N-benzyloxyl carbonyloxy succinimide, lithium bis(oxalato)borate, and lithium difluoro(oxalato)borate.

* * * * *